Figure 1:
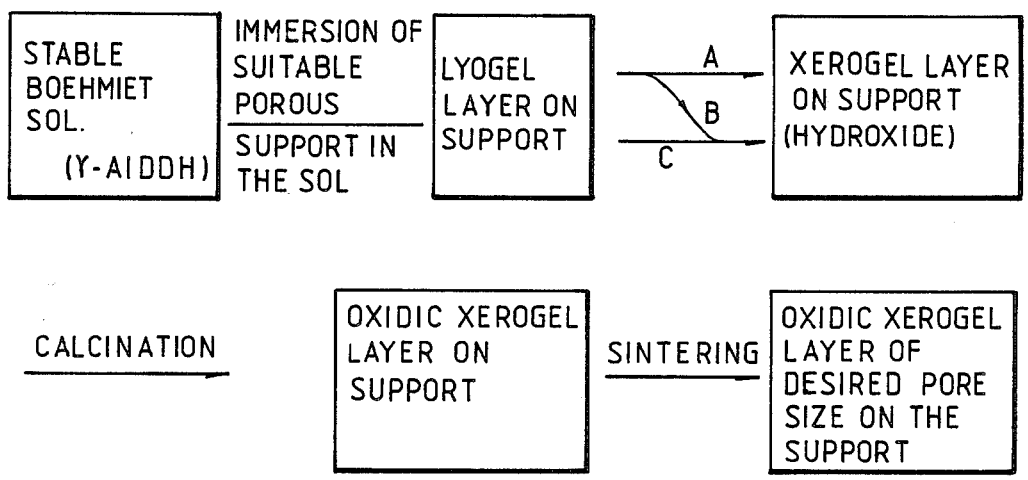

United States Patent [19]

Leenaars et al.

[11] Patent Number: 4,711,719

[45] Date of Patent: Dec. 8, 1987

[54] PROCESS FOR THE PRODUCTION OF CRACK-FREE SEMI-PERMEABLE INORGANIC MEMBRANES

[76] Inventors: Adriaan F. M. Leenaars; Anthonie J. Burggraaf; Klass Keizer, all of P.O. Box 217, 7500 AE Enschede, Netherlands

[21] Appl. No.: 647,545

[22] Filed: Sep. 5, 1984

[30] Foreign Application Priority Data

Sep. 5, 1983 [NL] Netherlands ........................ 8303079

[51] Int. Cl.$^4$ ............................................. B01D 13/00
[52] U.S. Cl. ................................. 210/500.26; 427/245
[58] Field of Search ............. 210/500.2, 510.1, 500.26, 210/490, 496; 55/16, 158; 427/244, 245, 246

[56] References Cited

U.S. PATENT DOCUMENTS

| 3,434,912 | 3/1969 | Peri | 161/46 |
| 3,923,654 | 12/1975 | O'Hern | 210/500.1 X |
| 3,944,658 | 3/1976 | Yoldas | 252/317 X |
| 4,251,377 | 2/1981 | Schleinitz | 210/500.2 X |
| 4,412,921 | 11/1983 | Leung et al. | 210/500.2 |
| 4,473,476 | 9/1984 | McMillan et al. | 210/500.2 X |

FOREIGN PATENT DOCUMENTS

| 0040282 | 11/1981 | European Pat. Off. | 496/ |
| 0092840 | 11/1983 | European Pat. Off. | 210/496 |
| 1440105 | 4/1966 | France | 210/496 |
| 2000803 | 9/1969 | France | 210/496 |
| 2150390 | 4/1973 | France | 55/16 |
| 2230601 | 12/1974 | France | 55/16 |

OTHER PUBLICATIONS

Patents Abstracts of Japan, vol. 3, No. 27(C-39), Mar. 7, 1979, p. 65 C39.
JP-A-54 2276 (Mitsubishi Kasei Kogyo K.K.) (09-0-1-1979) Abstract.

Primary Examiner—Frank Spear
Attorney, Agent, or Firm—Cushman, Darby & Cushman

[57] ABSTRACT

A process for the production of dry, crack-free mechanically and chemically stable, thin, semi-permeable, inorganic membranes by coating a microporous support of sintered metal oxide or metal hydroxide with a stable sol of Boehemite particles and subsequently drying and heating the coated support.

7 Claims, 4 Drawing Figures

PROCESS FOR THE PRODUCTION OF CRACK-FREE SEMI-PERMEABLE INORGANIC MEMBRANES

A process for the production of crack-free semi-permeable inorganic membranes.

The applicant lists as inventors: A. F. M. Leenaars, K. Keizer, A. J. Burggraaf, Chemical Technology Department, Technical University Twente.

The present invention relates to a process for the production of dry, crack-free, mechanically and chemically stable, thin, semi-permeable, inorganic membranes by coating a microporous support, consisting preferably of sintered inorganic oxides, with a stable suspension of an inorganic-membrane-forming coating material in a medium non-solving to the coating material and then heating the intermediate product.

Such a process is known from European Patent Application No. 0,040,282. According to this application a microporous support, consisting of carbon or sintered inorganic oxides and having a pore volume of from 5 to 60% and pore sizes of from 5 m$\mu$ to 40$\mu$, is coated with a 0.5 to 20% by weight suspension of an inorganic-membrane-forming coating material in a medium non-solving to the coating material in the presence of a volatile liquid miscible with the continuous phase of the suspension, said liquid drawing the membrane-forming coating material into the pores of the support without gel forming. The volatile liquid is then removed from the coating and the membrane heated to more than 25° C. and sintered at up to 1500° C.

This known process is considered to present the following disadvantages:

1. Nothing is said about the pore size distribution of the membrane. The coating suspension used is, however, relatively coarse (specific surface less than 300 m$^2$ per cm$^3$ of solid matter). The pores finally obtained can therefore be relatively large, depending on the pore size of the support. The pore size distribution of the support, according to the application not very narrow, will also affect the pore size and pore size distribution in the membrane itself. It will therefore be difficult to control these properties satisfactorily.

2. The thickness of the membrane layer proper, i.e. the layer deposited in the pores of the support, depends on the pore size distribution in the support and in particular on possible gradients over the thickness of the support and on local variations herein.

3. The imperatively required use of a volatile liquid miscible with the continuous phase of the coating suspension and non-solving to the coating to be formed, the use of water by itself being excluded.

U.S. Pat. Nos. 3,926,799 and 3,977,967 can also be mentioned here. According to both patents, a layer is deposited on a porous support, but the material must remain wet to prevent the forming of cracks caused by shrinking through drying. Little is mentioned about the pore size.

The object of the invention is to provide a dry, crack-free, mechanically and chemically stable, semi-permeable, inorganic membrane with a thickness of up to 20$\mu$ and a pore distribution kept within narrow limits, sharply bounded at least on the side of the large pores.

This object is achieved, according to the present invention, by coating a dry microporous inorganic support having a thickness of from 50$\mu$ to 5 mm and pores having a diameter of up to 5$\mu$ (preferably 0.5$\mu$) by immersion in a stable sol of colloidal metal oxide—or metal hydroxide particles having a particle size of from 3 nm to 2$\mu$, the concentration of the dispersed phase whereof in a medium (preferably water) non-solving to the metal oxide—or metal hydroxide particles amounts to from 0.01 to 25% by weight and preferably from 0.5 to 5% by weight, and where the sol in the boundary layer is first converted to a lyogel, removal of the support from the liquid, drying in air to a xerogel with a thickness of from 1 to 20$\mu$ and then drying and heating to a temperature of at least 390° C.

If desired, the membrane formed in this manner is hereafter sintered at a temperature of up to about 1500° C.

The advantages offered by the process according to the invention with respect to the known state of the art are as follows:

a satisfactory control of the pore size (by superior control of the particle size and the favorable particle shape, i.e. platelets);

a very narrow particle size distribution;

the possibility of obtaining very small pores.

This is where the true value of the invention lies. Owing to the latter advantage, the application of the invention is not restricted to separations in the liquid phase, e.g. dehydration processes, but also extends to gas separation, even up to relatively high temperatures.

The preparation of stable sols of colloidal metal oxide—or metal hydroxide particles does not form part of the invention and can be performed preferably according to the indications given in U.S. Pat. Nos. 3,941,719 and 3,944,658. By preference a stable Boehmite sol is used to start with.

FIG. 1 shows a schematic representation of the process according to the invention, starting with a stable Boehmite sol ($\gamma$-AlOOH). According to method A, drying is performed in air only, according to method B partially in air and then supercritically, and according to method C only supercritically.

Figure 2:
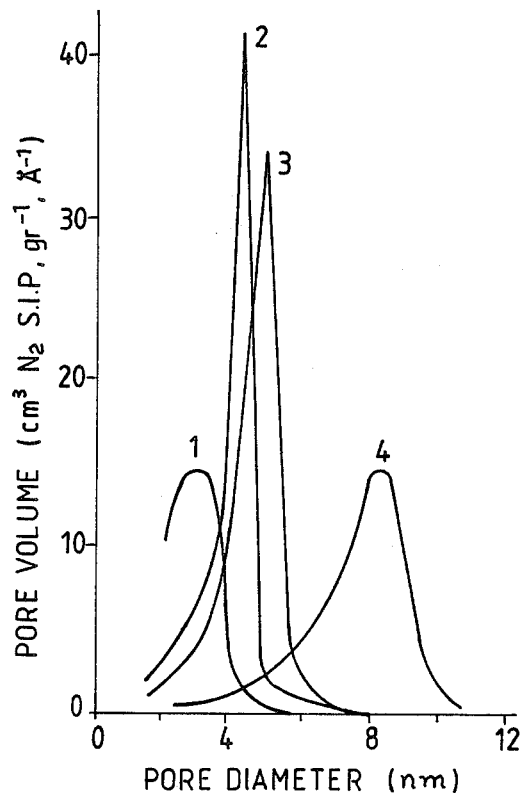

FIG. 2 shows by curves 2, 3 and 4 the pore-diameter distribution of samples heated to temperatures of 500° C., 600° C. and 730° C. respectively, when 0.07 mol HNO$_3$ per mol Boehmite was used; curve 1 shows the pore-size distribution of non-heated Boehmite ($\gamma$-AlOOH). These curves are based on cylindrical pores. Heating of the samples was performed at a heating-up rate of 10° C. per hour and the samples were maintained at the final temperature for 24 hours.

Figure 3:
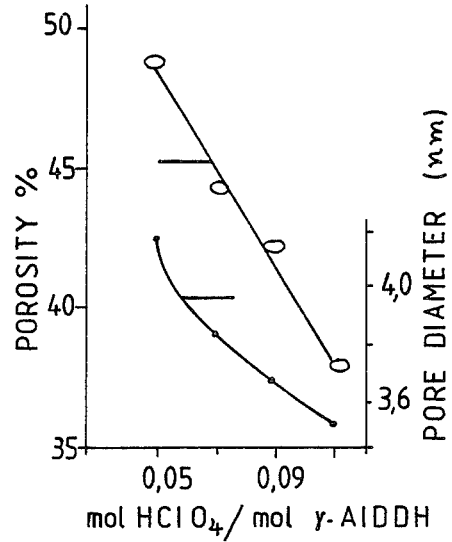

FIG. 3 shows the porosity and the pore diameter of samples calcined at 500° C., plotted against the acid concentration in the sol, HClO$_4$ being used as the acid. The effect of the acid concentration on the pore structure is absent when HNO$_3$ is used.

The suitability of the support is determined mainly by the pore-size distribution of the support. If the pores are too large, no layer will be formed as the sol particles will then be sucked into the support so that no lyogel is formed on it. On the other hand, it is true that a layer will be formed when the pores are too small, but the flow resistance of the final product will be too high. Examples of suitable dry, microporous supports are: $\alpha$-Al$_2$O$_3$ supports with a porosity of 60% by volume and a typical pore size of 0.34$\mu$, 90% of the pore volume being found between 0.1 and 0.53$\mu$, and $\alpha$-Al$_2$O$_3$ supports with a porosity of 46% by volume and a typical pore size of 0.12$\mu$, 90% of the pore volume lying between 0.08 and 0.17$\mu$.

Boehmite sols contain plate-shaped particles. This is important for obtaining a very small pore diameter as well as a small spread in the pore-size distribution. It is just this plate shape which at the same time enables very thin, crack-free membranes to be obtained.

When using Boehmite, a phase transformation takes place by heating to 390° C. This phase transformation can be represented by the following relation:

$$2AlOOH \rightarrow Al_2O_3 + H_2O$$

The pore volume increases during this transformation. The diameter of the pores depends on the heat treatment and increases from 3.5 nm in dried samples (200° C.) to 4.4 nm when heating at 500° C. and to 8.2 nm when sintering at 780° C. Over this range of temperatures the total porosity is practically constant. As shown in Table I, the pore size increases rapidly at sintering temperatures above 900° C. As appears from FIG. 2, the spread in pore size of a sample is small. In particular, pores larger than the typical pore size are nearly absent. No pores with a diameter of more than 10 nm were found by a test with a mercury-porosimeter in samples treated at 800° C. or lower temperatures.

It appeared that, when using $HClO_4$ as the acid, the diameter of the pores became smaller and the porosity of the final product decreased as the acid concentration in the sol increased. E.g., when using 0.05 mol $HClO_4$ per mol $\gamma$-AlOOH, a porosity was obtained of 48% and a pore diameter of 4.4 nm whereas, when using 0.11 mol $HClO_4$ per mol $\gamma$-AlOOH, the porosity obtained was 38% and the pore diameter 3.5 nm. These results apply to samples treated at 500° C. and are illustrated in FIG. 3 for cylindrical pores.

Only the shape and size of the primary crystallites are of importance for the pore size of the membrane, provided the crystallites are bound merely loosely in agglomerates. The size of the agglomerates is not critical, but determines the maximum admissible pore size of the support.

When bringing the sol into contact with the microporous support, the dispersion medium (preferably water) is, unlike in the aforesaid known processes, removed by capillary suction of the pores in the support from the boundary layer between support and sol, whereby the sol in this boundary layer becomes unstable and is transformed into a lyogel, the density in solid matter whereof is low.

After removal of the support from the liquid, the gel layer remains present on the support and is converted to a xerogel by drying in air. The drying rate used depends on the layer thickness, i.e., the greater (smaller) the thickness of the layer, the smaller (greater) the drying rate. E.g., a crack-free membrane $2\mu$ in thickness is obtained when the intermediate product is calcined, immediately after the preparation of the lyogel, at 10° C. per hour up to the final temperature, whereas the same treatment will result in a cracked membrane if a final product is produced with a membrane thickness of $7\mu$. The forming of cracks can be prevented in this case by drying the intermediate product for 24 hours in air prior to the calcination.

Large capillary pressures occur in drying and the gel layer shrinks more strongly than in the aforesaid known processes, e.g., from an initial relative density of 10% by volume in the lyogel phase to a density of 60% by volume in the xerogel phase.

The strongly bound water is removed from the xerogel by calcination and the hydrated oxide or hydroxide (Boehmite) is transformed into crystalline oxide. It is in this phase that the material acquires mechanical stability, chemical resistance and its final microstructure as regards final porosity and pore diameter.

It appeared that the pore diameter becomes greater as the sintering temperature of the ceramic membrane becomes higher. This is illustrated by the table below (see also FIG. 2):

TABLE I

|  | $T_s =$ 500° C. | $T_s =$ 600° C. | $T_s =$ 780° C. | $T_s =$ 1000° C. |
|---|---|---|---|---|
| Porosity in % | 48 | 48 | 47 | 41 |
| Pore diameter in nm (I) | 4.4 | 5.1 | 8.2 | 78 |
| Pore diameter (width of slot in nm (II) | 3.0 | 3.5 | 5.2 | 39 |

(I) = for cylindrical pores (isometric particles)
(II) = for slot-shaped pores (plate-shaped particles)

Figure 4:
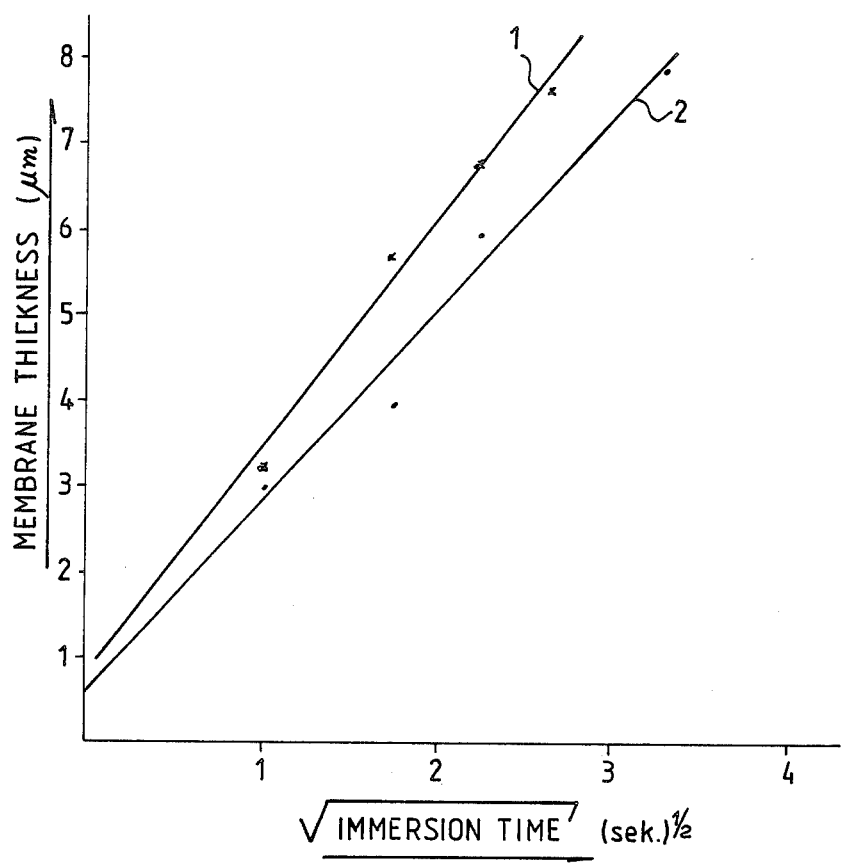

The layer thickness of the membranes can be varied within certain limits by suitable combinations of pore diameter and porosity of the support, sol concentration and immersion time. FIG. 4 shows the effect of sol concentration and immersion time on the membrane thinkness after calcination. The sol used herefore contains 0.07 mol $HNO_3$ per mol Boehmite, the supports used have a typical pore size of $0.34 \pm 0.2\mu$ and a porosity of 60%. It appears from FIG. 4 that the process during which the lyogel is formed proceeds very quickly and is suitable for mass production. The straight line (1) in the diagram relates to a sol concentration of 1.3 mol/liter (7.4% by weight of Boehmite) and the straight line (2) to a sol concentration of 0.8 mol/liter (4.7% by weight of Boehmite).

According to a special embodiment which enables crack-free membranes to be obtained with greater layer thicknesses and porosities than those mentioned above, drying is performed entirely or in part under supercritical conditions. With this procedure, the liquid phase is removed from the lyogel without the presence of a meniscus and without the action of large capillary forces. The water is removed for this purpose from the lyogel by washing out with a liquid, inert with respect to the oxide or hydroxide and preferably having a low critical pressure and temperature. Nor may the liquid peptize the lyogel. After full saturation of the gel layer with this liquid, for which purpose it is possible to use, e.g., butanol, the whole is heated in a pressure vessel to a temperature higher than the critical point of the liquid, whereupon the supercritical vapor is removed and the gel membrane cooled. The usual calcination—and possibly sintering procedure can then be applied.

The membranes obtained by the process according to the invention can be used up to a temperature of 900° C. while retaining small pore diameters, e.g. for gas separation.

The production and use of the inorganic membranes is illustrated by the following examples.

EXAMPLE I

A round microporous plate of $\alpha$-$Al_2O_3$ having a diameter of 4 cm, a thickness of 2.3 mm and a typical pore size of $0.12\mu$ is immersed for 2 seconds in a Boehmite sol with 0.07 mol $HNO_3$ per mol Boehmite, wherein the Boehmite concentration amounts to 3% by weight. The resulting lyogel lying on the support is dried in air for 24 hours, is then heated to 500° C. at a rate of 10° C. per hour and maintained at this temperature for 18 hours.

The layer thickness of the membrane amounts to 3.5μ and the pore size distribution of the membrane material is as shown in FIG. 2. The water flux of the membrane on the support is 1.0 cm³ H₂O per cm² of membrane surface per bar pressure difference per hour. To determine the separation properties of the membrane, a solution is used of 300 mg serum-albumin (a protein with a molecular weight of 69,000 Dalton) per liter of demineralized water. In a so-called stirred dead-end permeation cell a retention was measured of 96% and a flux of 0.3 cm³.cm⁻².bar⁻¹.hr⁻¹.

EXAMPLE II

A round microporous plate of α-Al₂O₃ having a diameter of 4 cm, a thickness of 2 mm and a typical pore size of 0.34μ is immersed for 2 seconds in a Boehmite sol with 0.09 mol HClO₄ per mol Boehmite, wherein the Boehmite concentration is 14% by weight. The resulting lyogel lying on the support is dried in air for 24 hours and the residual water is then washed out with secondary butanol.

This product is dried supercritically in a pressure vessel at 280° C. and 100 bar, then heated to 500° C. at a rate of 10° C. per hour and maintained at this temperature for 24 hours. The layer thickness of the membrane amounts to 7μ and the typical pore size is 7 nm for cylindrical pores. The water flux of the membrane on the support is 0.8 cm³.cm⁻².bar⁻¹.hr⁻¹. For the ultrafiltration of a solution of 250 mg albumin per liter of demineralized water, the retention amounts to 43% and the flux to 0.4 cm³.cm⁻².bar⁻¹.hr⁻¹.

In general, the invention can be said to consist in that a microporous support is used of α-Al₂O₃ with a typical pore size of up to 5μ but preferably of from 0.10μ to 0.50μ, that a Boehmite sol is used with dispersed particles of from 3 nm to 2μ and containing HNO₃ or 0.01 to 0.20 mol HClO₃ per mol Boehmite, the sol concentration being 0.01 to 25% by weight with a contact time of support and sol of from 1 to 5 seconds, but preferably about 2 seconds, depending on the sol concentration used and on the desired thickness of the membrane layer of up to 20μ, and that the intermediate product is dried and heated to a temperature of at least 390° C. and at most 1500° C.

Finally, the invention also relates to a membrane on a microporous support, said membrane having a thickness of less than 20μ and being produced according to the above specification.

We claim:

1. A process for the production of dry, crack-free mechanically and chemically stable, semi-permeable inorganic membranes by coating a microporous support of sintered α-Al₂O₃ by contacting the support with a sol containing particles of Al₂O₃ and drying and heating the coated support, characterized in that
    (a) the support has a thickness from 50μ to 5 mm;
    (b) the sol comprises as Al₂O₃ particles Boehemite particles with a size of from 3 nm to 2μ, dispersed in water in a concentration from 0.01 to 25% by weight, the water also containing HNO₃ or HClO₄ in a concentration of 0.01 to 0.20 mol per mol Boehemite;
    (c) said support is immersed in a dry state in said sol for from 1 to 5 seconds; and
    (d) said contacted support after being dried in air is heated to a temperature of at least 390° C. and at most 1500° C., wherein said membrane is less than 20μ in thickness.

2. A process according to claim 1, characterized in that the sintered α-Al₂O₃ is used as support, having a pore size of from 0.10μ to 0.50μ.

3. A process according to claim 1, characterized in that the support has a pore size of from 0.12μ to 0.34μ.

4. A process according to claim 1, characterized in that the sol contains 0.01 to 0.20 mol HClO₄ per mol Boehemite and that the immersed support is dried and heated at 500° C. for 24 hours.

5. A process according to claim 1, characterized in that the sol contains 0.03 to 0.11 mol HClO₄ per mol Boehemite and that the immersed support is dried and heated at 500° C. for 24 hours.

6. A process according to claim 1 characterized in that the sol contains 3% by weight Boehemite and that the time of contact of the dry support and the sol is adjusted to from 1 to 5 seconds and thereafter dried and heated at a temperature of from 390° C. to 1500° C.

7. An inorganic membrane produced by the process of claim 1.

* * * * *